United States Patent
Ducharme et al.

(10) Patent No.: US 10,365,663 B2
(45) Date of Patent: Jul. 30, 2019

(54) TETHER ORIENTATION SENSOR FOR CONTROLLING THE POSITION OF A TETHERED AIRCRAFT

(71) Applicant: Hoverfly Technologies, Inc., Orlando, FL (US)

(72) Inventors: Alfred D. Ducharme, Oviedo, FL (US); Daniel Burroughs, Casselberry, FL (US); Lucas C. Whitaker, Orlando, FL (US)

(73) Assignee: Hoverfly Technologies, Inc., Orlando, FL (US)

( * ) Notice: Subject to any disclaimer, the term of this patent is extended or adjusted under 35 U.S.C. 154(b) by 119 days.

(21) Appl. No.: 15/344,393

(22) Filed: Nov. 4, 2016

(65) Prior Publication Data
US 2017/0147007 A1    May 25, 2017

Related U.S. Application Data

(60) Provisional application No. 62/252,293, filed on Nov. 6, 2015.

(51) Int. Cl.
*G05D 1/08* (2006.01)
*B64C 39/02* (2006.01)

(52) U.S. Cl.
CPC ......... *G05D 1/0866* (2013.01); *B64C 39/022* (2013.01); *B64C 39/024* (2013.01); *B64C 2201/027* (2013.01); *B64C 2201/108* (2013.01); *B64C 2201/141* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,931,727 B2* | 1/2015 | Engblom | ............... | B64C 37/02 244/2 |
| 9,056,677 B1* | 6/2015 | Jensen | .................... | B64C 31/06 |
| 9,214,022 B1* | 12/2015 | Hallamask | ............... | B64F 1/02 |
| 9,580,173 B1* | 2/2017 | Burgess | ............... | B64C 39/024 |
| 9,800,091 B2* | 10/2017 | Nugent, Jr. | .......... | H04B 10/807 |
| 9,969,494 B1* | 5/2018 | Buchmueller | ........ | B64D 47/08 |
| 2011/0266809 A1* | 11/2011 | Calverley | ................ | F03D 5/00 290/55 |
| 2017/0147007 A1* | 5/2017 | Ducharme | ........... | G05D 1/0866 |
| 2018/0072404 A1* | 3/2018 | Prager | .................. | G05D 1/0858 |

* cited by examiner

*Primary Examiner* — Thomas G Black
*Assistant Examiner* — Ana D Thomas
(74) *Attorney, Agent, or Firm* — Howard M. Gitten; Lewis Brisbois Bisgaard & Smith LLP

(57) ABSTRACT

An unmanned aerial vehicle has a substrate. A tether sensor is mounted on the substrate. The tether sensor determines an orientation of the tether relative to the substrate. A micro controller, receiving the measured orientation from the tether sensor, determines an orientation of the tether relative to the substrate, and as a function of the orientation, determines a corrective value and outputs the corrective value to the unmanned aerial vehicle as at least one of a roll output and a pitch output control signal.

14 Claims, 6 Drawing Sheets

TETHER ORIENTATION SENSOR FOR CONTROLLING THE POSITION OF A TETHERED AIRCRAFT

CROSS REFERENCE TO RELATED APPLICATION

This application claims the benefit of U.S. Provisional Patent Application No. 62/252,293, filed Nov. 6, 2015, the contents of which are herein incorporated.

BACKGROUND OF THE INVENTION

The following invention is directed to a system for controlling the position of a tethered unmanned aerial vehicle (UAV), and more particularly, to control the position of the tethered unmanned aerial vehicle by sensing the angular vector of the tether connected thereto as a function of the tether strain and/or orientation relative to the platform at the connection point to the UAV.

Unmanned aerial vehicles, have the ability to hover. UAVs, such as multiple rotor helicopters, can be tethered for safety, communications, and long term power. This increases the ability of these crafts to stay aloft. This provides the benefit of being able to maintain a consistent visual monitoring of a specified area. These aircraft typically rely on either visual or satellite navigation in order to maintain their location relative to the ground. Automated visual systems from machine vision utilize lighted or reflected beacons mounted on the aircraft or ground. These systems can lose visual lock as a function of atmospheric conditions or shifting of the light or beacon causing the aircraft to lose position or fail.

Other aircraft utilize satellite or GPS navigation systems. These systems are satisfactory, however radio frequency noise, both intended and ambient, or loss of satellite integrity, can cause the aircraft to lose position or fail. As present applications require higher reliability over long periods of time, traditional methods like those above result in a high probability of failure.

Accordingly, a system and method for overcoming the shortcomings of the prior art is desired.

SUMMARY OF THE INVENTION

The present invention determines position and stabilizes the position by sensing the two dimensional angular strain placed on the aircraft by the tether at the attachment point. The invention also determines position as a function of acceleration and orientation relative to the direction of gravity of the UAV. In response to the sensed strain, the system produces controlling signals to guide the UAV maintain the desired orientation relative to ground. Three or more strain sensors are disposed at, or near the connection point between the tether and the UAV. A gyroscope and accelerometer may be positioned on the UAV. The tethered attachment is located at an intersection of the axes formed by the three or more strain sensors. The strain sensors sense a change in strain as the aircraft moves away from a normal above the desired position relative to ground while the gyroscope and accelerometer measure orientation of the tether relative to the direction of gravity, as well as determining terrestrial position of the UAV. The angular strains at the tethered attachment point are sensed as a net force differential having both magnitude and direction, and are utilized to create a control signal to adjust the vehicle back to the starting position.

BRIEF DESCRIPTION OF THE DRAWINGS

The present disclosure is better understood by reading the detailed description with reference to the accompanying drawing figures in which the reference numerals denote the similar structure and refer to the elements throughout in which.

DESCRIPTION OF THE PREFERRED EMBODIMENT

Figure 1:
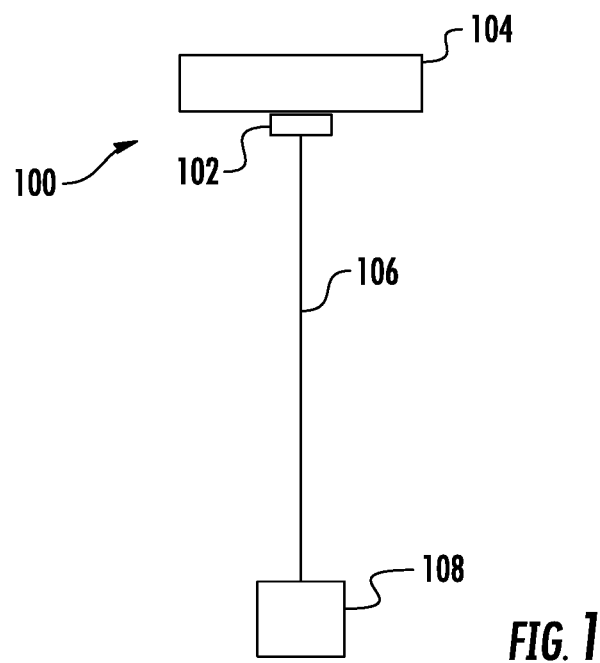
FIG. 1 is a schematic diagram of the unmanned aerial vehicle constructed in accordance with the invention.
Figure 2:
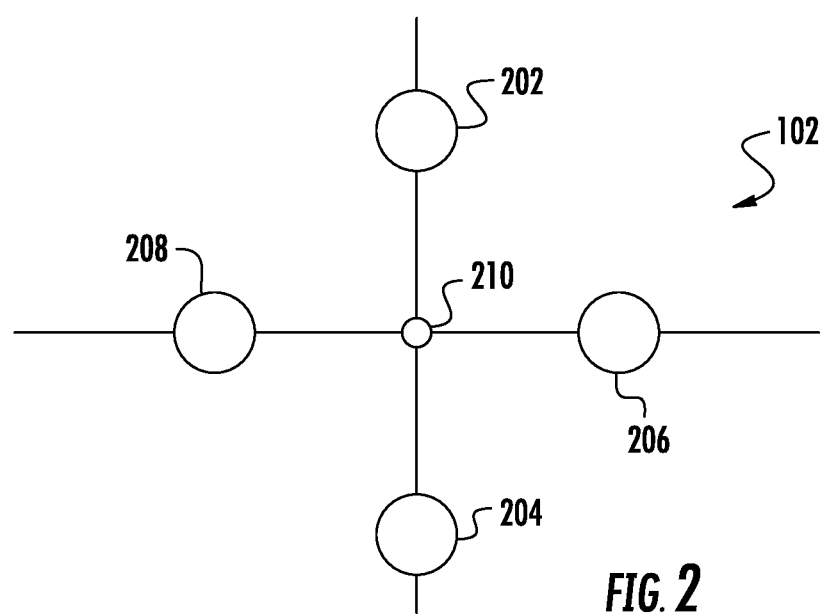
FIG. 2 is a schematic diagram of a strain sensor arrangement relative to the tether connection in accordance with one embodiment of the invention.

Turning now to the drawings, in which similar reference characters denote similar elements throughout the several views, the figures illustrating a tethered unmanned aerial vehicle. Reference is made to FIGS. 1 and 2 wherein a schematic diagram of the invention in accordance with a preferred embodiment thereof is provided. A system 100 includes a UAV 104 either connected to, or embodying, a tethered sensor 102. Not part of the system is a tether 106, coupling aircraft 104 through tether sensor 102 to a ground station 108.

In a preferred non-limiting embodiment, tether sensor 102 utilizes four sensors for measuring the forces applied at the tether attachment point 210 to system 100. More specifically, two sets of sensors are used in the preferred embodiment, with each sensor pair defining an axis orthogonally disposed relative to the axis of the second set of sensors; the intersection of the axes being substantially at the tether connection 210.

More specifically, as seen in FIG. 2, tether sensor 102 has an attachment point at the tether connection 210. A pair of Y axis sensors 202, 204 are disposed on opposed sides of tether connection 210 to in effect draw a line through tether connection 210 between sensors 202, 204. Similarly, a sensor pair along the X axis formed by a first sensor 206 and a second sensor 208, disposed on either side of tether connection 210, are provided on tether sensor 200. Tether sensors 206, 208 are disposed on either side of tether connection 210 so that an axis extending from sensor 206 to sensor 208 substantially passes through tether connection 210. In a preferred embodiment, the axis formed by sensor 206, 208 is substantially orthogonal to the axis formed by sensors 202, 204.

In this way, with tether connection 210 located at the intersection of the two sensor axes, and with the tether 106 secured to a fixed location such as ground station 108, any movement of the aircraft away from a normal above ground station 108 as shown in FIG. 1 is realized as an angular strain at the tether connection 210 of the UAV 104. Any deviation is sensed as a net force differential amongst sensors 202, 204, 206, 208. The difference of this output between any two of the sensors in a common axis is proportional to the angular strain of tether 106 at tether connection 210 relative to that axis. The strain sensors 202, 204, 206, 208 generate positive values proportional to this strain as a function of the direction and strength of the strain force relative to the strain force at the desired fixed position (the normal shown in FIG. 1).

Because of gravity the natural tendency of the tether 106 is to hang directly below aircraft 104. When outside forces, such as wind act on the tether, force differential signals are calculated as a function of the different strain values. The signals are used as part of a control signal at UAV 104 to return to a balanced net sensed strain; over ground station 108. These different signals can be used as control inputs for adjusting the position of aircraft 104.

It should be noted, while four sensors are used in the preferred embodiment, as few as three sensors may be used in which a triangulation logic of the force differentials relative to the tether connection is utilized. Having a number of sensors greater than four is controlled only by the economics and the space available on tether sensor 102. Furthermore, tether sensor 102 may be its own distinct platform as shown in FIG. 1, or may be incorporated into aircraft 104. If separate from UAV 104, the tether sensor 102 is operatively coupled to the control circuitry of UAV 104.

Figure 4:
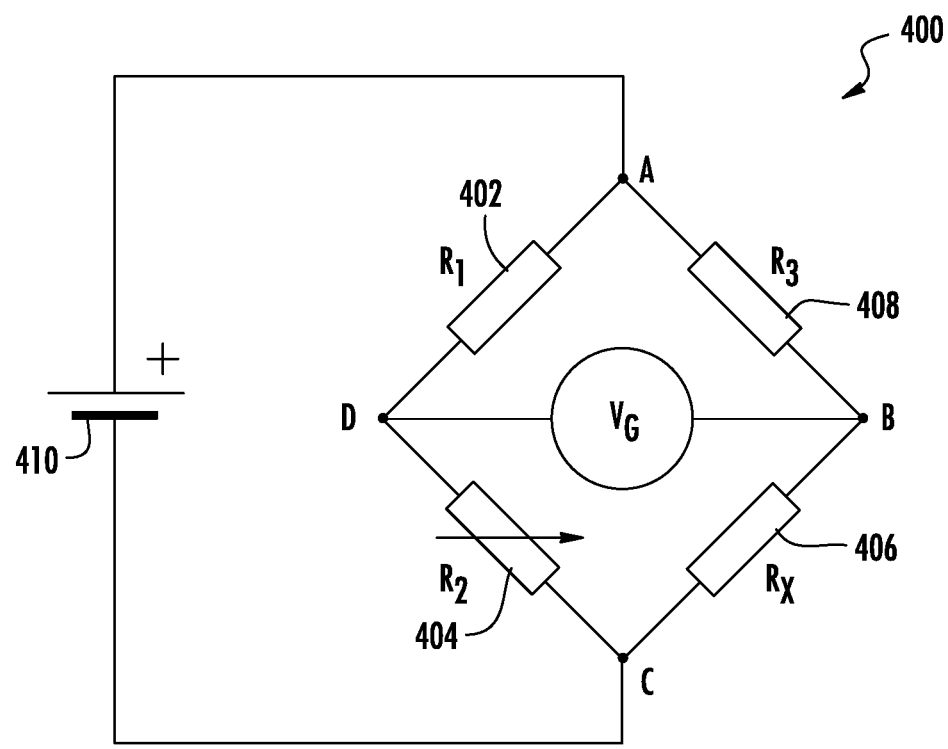
FIG. 4 is a circuit diagram of an exemplary embodiment of a strain sensor incorporated in the invention.
Figure 5:
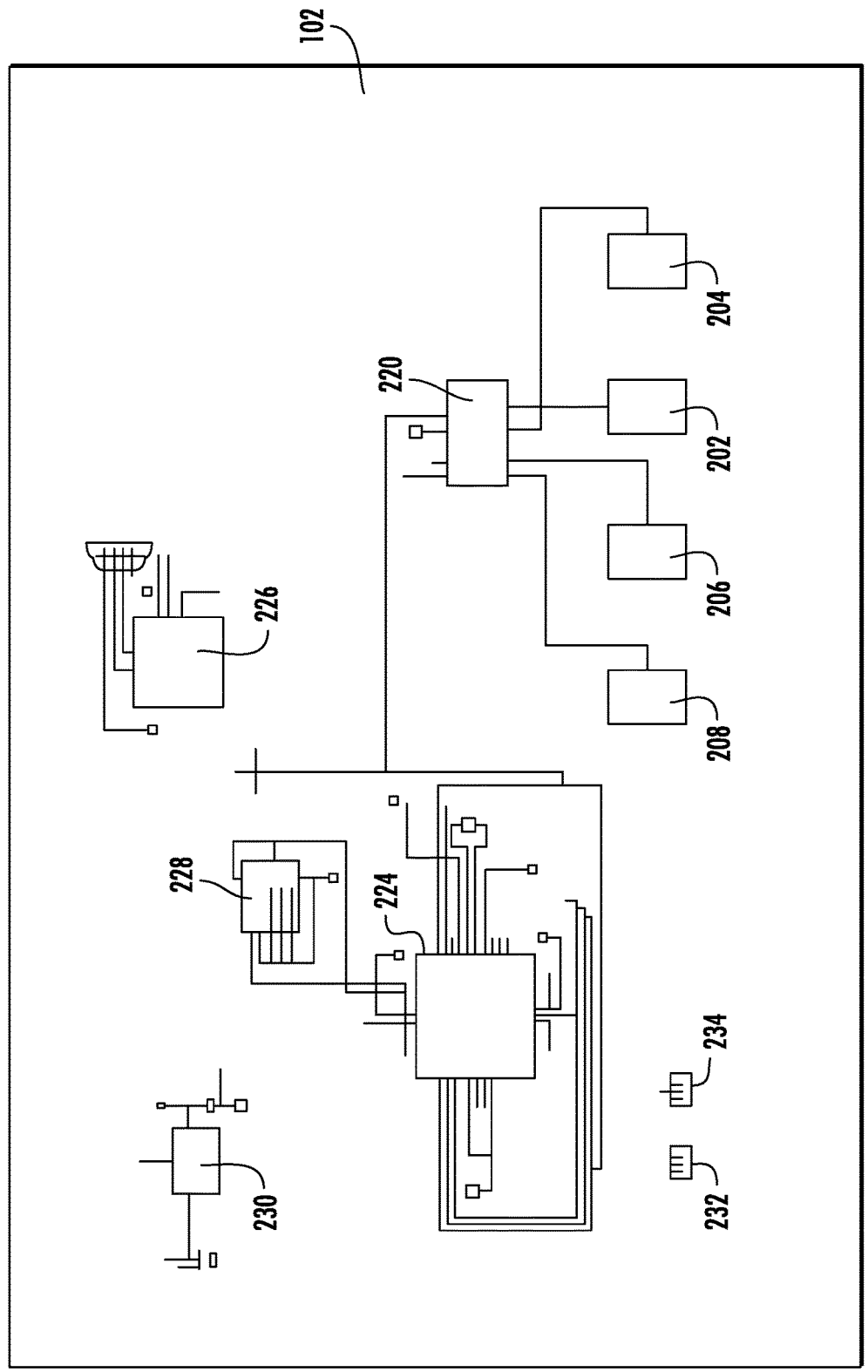
FIG. 5 is a schematic diagram of the control system for the unmanned aerial vehicle in accordance with the invention.

Reference is now made to FIGS. 4 and 5 in which the tether sensor 102 is shown with greater particularity. In one embodiment in the invention, as seen in FIG. 5, the outputs of sensors 202, 204, 206 and 208 are input to an analog to a digital converter 220. Analog to digital converter 220 provides an input to a tether sensor onboard microcontroller 224. In a preferred embodiment, microcontroller 224 is distinct from the on board controller for controlling the flight characteristics of UAV 104. While sensors 202, 204, 206, 208 may be piezo strain sensors in a preferred non limiting embodiment, resistor/potentiometers or optical sensors capable of measuring the angular vector of tether deflection between tether 106 and craft 104 may be used as described in embodiments below.

Microcontroller 224 also receives input from a flash memory 228 storing predetermined characteristics corresponding to the expected net force at tethered connection 210 when UAV 104 is at the desired position. A programming port 226 may be provided onboard tether sensor 102 to input operation logic to microcontroller 224 as well as parameters to be stored in flash memory 228. The programming port 226 may be on board tether sensor 102 or may be a memory in wireless communication with microcontroller 224. As will be discussed in greater detail below, microcontroller 224 in response to the input from sensors 202, 204, 206, 208 provides output controls to a roll output 232 and a pitch output 234 for controlling the operation of aircraft 104. The entire system is powered, in a preferred non-limiting embodiment, by tether 106 through a power regulator 230.

Figure 3:
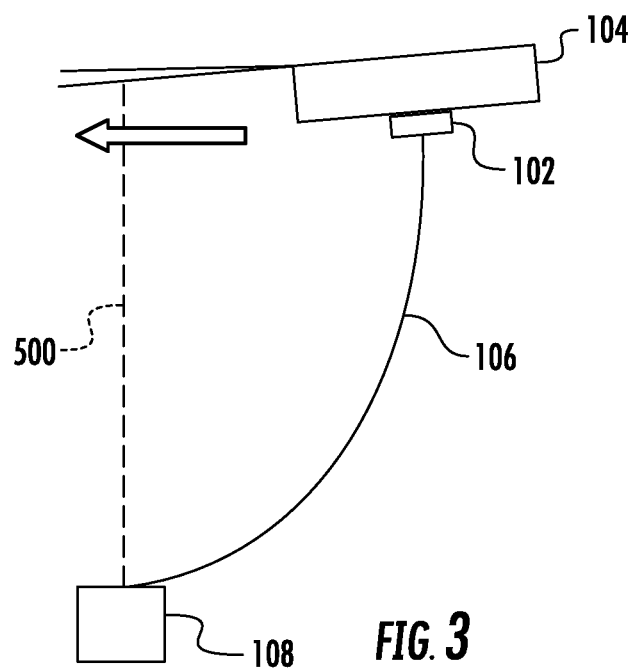
FIG. 3 is a schematic diagram demonstrating operation of the invention to adjust the position of the aircraft when the aircraft is off position.

Reference is now made to FIG. 3 wherein a description of the corrective control of the positioning of aircraft 104 is provided. When wind, by way of example, is applied to system 100, aircraft 104 will tend to move down wind away from the desired position, in this embodiment away from normal 500 corresponding to the initial position in FIG. 1. UAV 104 moves away from normal as seen in FIG. 3.

To keep the aircraft 104 over the ground station 108, tether sensor 102 provides an output to aircraft 104 to produce a controlling signal, as a function of sensed strain and calculated force differential which UAV 104 may use in the controlling signal it generates to control flight; such signal is known from co-pending U.S. patent application Ser. No. 13/659,024. By providing the correction values for roll and pitch, at roll and pitch outputs 232, 234, tether sensor 102 can command aircraft 104 to roll or pitch into the wind causing it to move in the direction of the wind returning tether 106 to normal 500.

Each sensor 202, 204, 206, 208 continuously provides a strain output to microcontroller 224 either as a continuous live feed or at timed intervals. Microcontroller 224 produces controlling signals by calculating a force differential as a function of the difference between the two sensors along a common access. The difference yields a result that is proportional to the angular strain on tether 106. Microcontroller 224 calculates the difference and utilizes a control algorithm such as a Proportional-Derivative-Integral (PID) controller to determine what control signals are output. The coefficients of this PID can be adjusted for different aircraft 104 to yield the required roll and pitch control signals needed to keep the aircraft positioned at a fixed position relative to ground station 108.

The signals from roll and pitch outputs, 232, 234 determined by tether sensor 102 are used as inputs to a flight controller on board aircraft 104. Therefore, if an angular strain exists, by way of example, along the roll axis, UAV 104 would be commanded to roll in a direction thereby causing UAV 104 to move in a direction to eliminate the angular strain on tether 106. In a preferred non-limiting embodiment, two independent PID controllers may be used for roll and pitch, respectively, to yield separate command inputs for the flight controller.

Roll and pitch angles of UAV 104 corresponding to the desired fixed position, are stored in microcontroller 224, or flash memory 228. When UAV 104 rolls or pitches to create a sensed strain value, these stored strain values, and their effect on the strain values are removed from the calculation to obtain a net force differential from the start position. This is accomplished either by using the calculated roll and pitch values of UAV 104 or the separate roll and pitch sensor used with tether sensor 102.

Figures 7A, 7B:
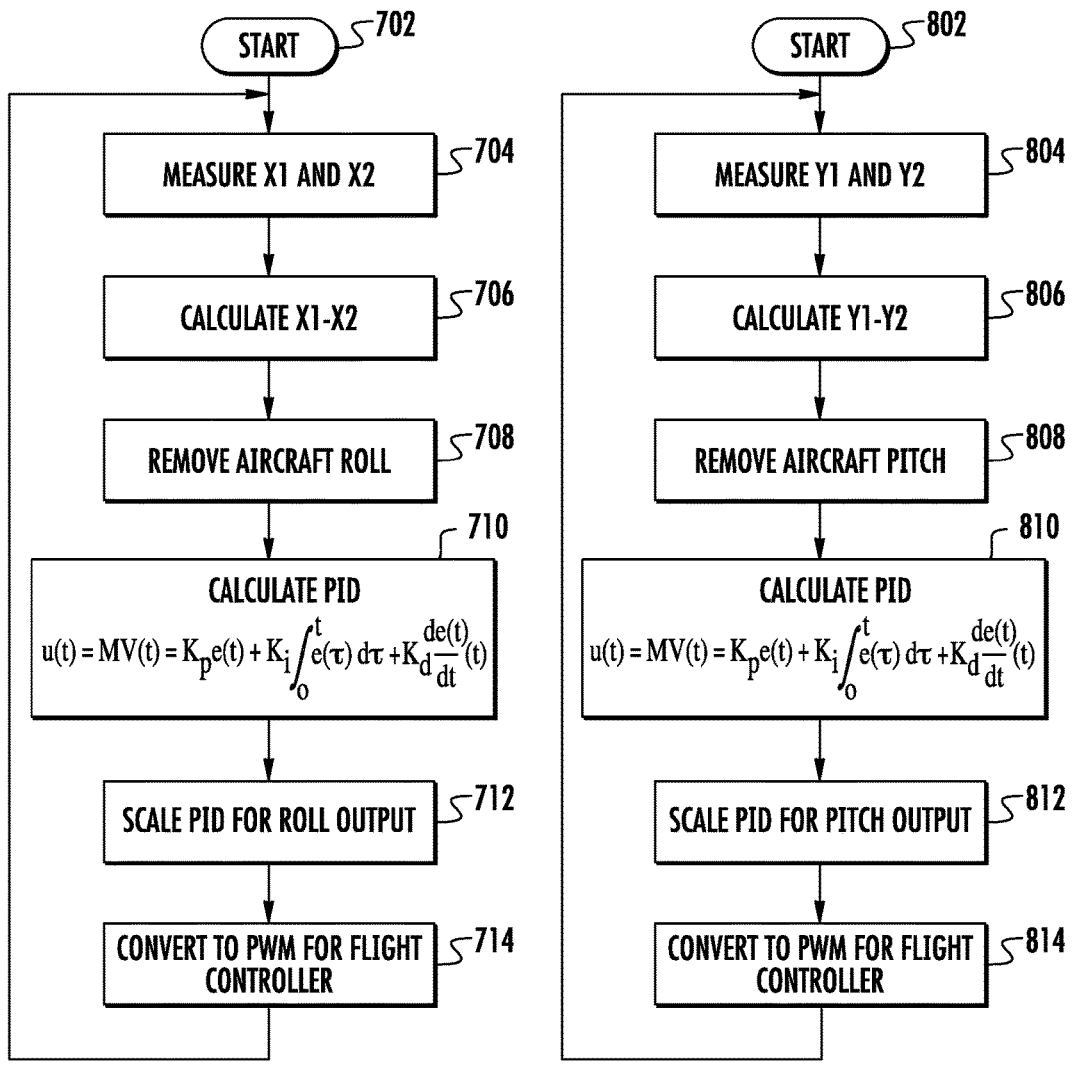
FIG. 7a is a flow chart for controlling the roll of the unmanned aerial vehicle in accordance with the invention.
FIG. 7b is a flow chart for controlling pitch of the unmanned aerial vehicle in accordance with the invention.

Reference is now made to FIG. 7a which provides a mode of operation. As seen in FIG. 7a to control roll, by way of example, the process starts in step 702 and strain at tether sensor 102 is measured in a step 704; the strain experienced at sensors 206, 208. In step 706 tether sensor 102 calculates a difference between the sensed values at sensors 206, 208 and at a step 708 removes the aircraft roll, if any, relative to the start position by calculating the PID in a step 710. The PID is scaled for the roll output at roll output 232 in a step 712. The output is then converted to a Pulse Width Modulated (PWM) signal format or a format consistent with the type of flight controller used in a step 714.

Similarly, as seen in FIG. 7b the process for adjusting pitch is begun in a step 802. The output of sensors 202, 204 is measured in a step 804. The differential between the sensors is calculated in a step 806 and the process for removing aircraft pitch, if any, is performed in a step 808. The PID is calculated in a step 810 and the calculation is scaled for pitch output 234 in a step 812. The pitch output is converted to PWM for the onboard flight controller in a step 814. Each of these processes is continually repeated at predetermined intervals and the outputs from roll output 232 and pitch output 234 are continuously updated as inputs to the onboard controller for aircraft 104.

As known from U.S. application Ser. No. 13/659,024 UAVs utilize multirotor flight controller that combines outputs from gyroscopes and accelerometers to vary the speed of multiple rotors on board the UAV to stabilize the aircraft in the air. This flight controller operates independently from the sensor 102 described herein. The existing on board flight controllers have a mode called stabilizer auto leveling. In this mode the craft is continually commanded to keep the plane of the aircraft motors and flight controller relative to the ground, but this is not the same as position relative to a desired location. The flight controller also may receive outside input for roll and pitch as described above. It is these inputs that cause the aircraft to roll or pitch at an angle away from level to adjust and return to the desired position.

Roll output on board 232 and pitch output 234 from tether sensor 102, as calculated in accordance with FIGS. 7a, 7b in one non-limiting embodiment, may be used as inputs to the known on board flight controller (not shown). Therefore, if an angular strain exists along the roll axis, aircraft 104 would be commanded in that same direction causing aircraft 104 to move in that direction to eliminate angular strain on tether 106. In the preferred embodiment as described above, two independent PID controllers may be used for roll and pitch calculation to yield separate command inputs for the flight controller. In accordance with the invention, roll and pitch angles of aircraft 104 must be capable of being controlled by the onboard controller in response to the inputs of the inventive tether sensor 102. When aircraft 104 rolls or pitches to offset the strain angle, these angles and their effect on the strain angle must be removed. This is accomplished by using the aircrafts calculated roll and angle either supplanted or supplemented by the values output by separate roll and pitch sensors 232, 234 providing updated outputs from tether sensor 102.

Tether sensor 102 measures the angle between the tether 106 and the aircraft 104. The aircraft is independently trying to stay level to the horizon. If there is a sensed angle in tether 106 the aircraft 104 will need to be commanded in the same direction as the tether angle. This would add to the angle between the craft 104 and the tether 106. So in order to command the craft appropriately, the angle of the craft with respect to the horizon must be removed so that the angle of the tether 106 to the horizon only is used in the PID control loops. This can be done either by using the roll and pitch of the aircraft 104 generated by the flight controller or by an independent roll and pitch sensor. In a preferred non limiting embodiment as described below, the tether sensor 102 may include a 3-axis accelerometer and a 3-axis gyroscope combined in a complimentary filter to produce the real-time roll and pitch of the aircraft (independently but equivalent to the flight controller roll and pitch). In, summary the roll and pitch of the aircraft must be subtracted from the roll and pitch produced by the tether sensor 102 so that only the tether roll and pitch with respect to the horizon are used.

It should be realized that the normal of tether 106 relative to tether sensor 102 is used for ease of discussion because the starting value is relative zero for net strain. But, the invention compensates for changes in net strain, such that if tether sensor 102 knows the strain values sensed in an orientation such as that of FIG. 3, ahead of time, those values may be stored in flash memory 228 as the desired location. Correction would then be calculated for net strain from those beginning values; and changes in net strain from those values would be used to calculate pitch and roll signal inputs to UAV 104.

Reference is now made to FIG. 4 in which one embodiment of a sensor 202-206 is provided by way of example. The specific sensor used is a resistive loaded cell in a preferred non-limiting embodiment. In the preferred embodiment, resistors 402-408 make up Wheatstone bridge 400, in one exemplified embodiment, resistor 404 has an unknown resistance while resistors 402, 406, 408 have a known resistance. The resistors are placed across a voltage source and monitored for voltage changes between midpoints B, D, as known in the art.

Figure 6A:
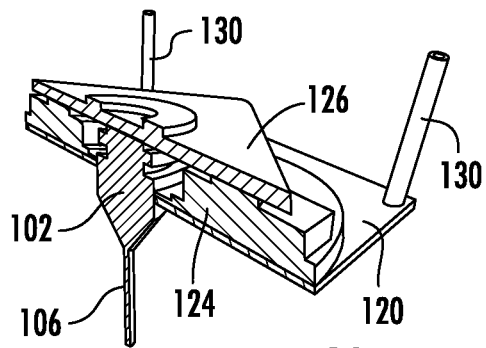
FIG. 6a is a perspective view of the platform for the system constructed in accordance with the invention.
Figure 6B:
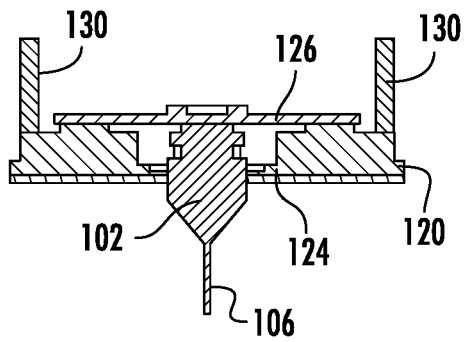
FIG. 6b is a sectional view of the platform for the system constructed in accordance with the invention.
Figure 6C:
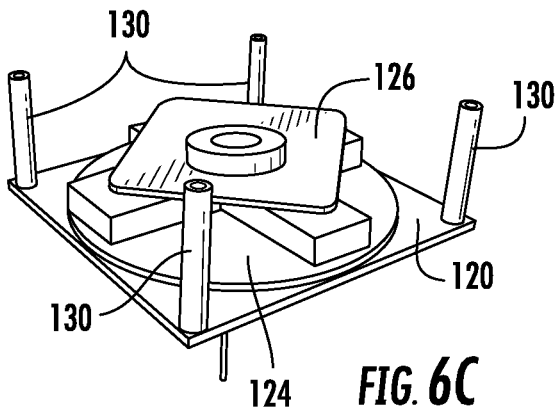
FIG. 6c is a perspective sectional view of the platform for the system constructed in accordance with the invention.

As seen in FIGS. 6a-6b examples of mechanical mounting of tether sensor 102 are provided. Tether 106 is mechanically connected to tether sensor 102. A substrate 120 having an opening 122 therein receives and supports tether sensor 102. Tether sensor 102 is fixed to substrate 120 by a series of supporting plates 124, 126. Rods 130 extend from substrate 120 for connecting tether sensor 102 to aircraft 104. It is understood to those skilled in the art, that tether sensor 102 may be unitarily incorporated into the chassis of aircraft 104.

Figure 8:
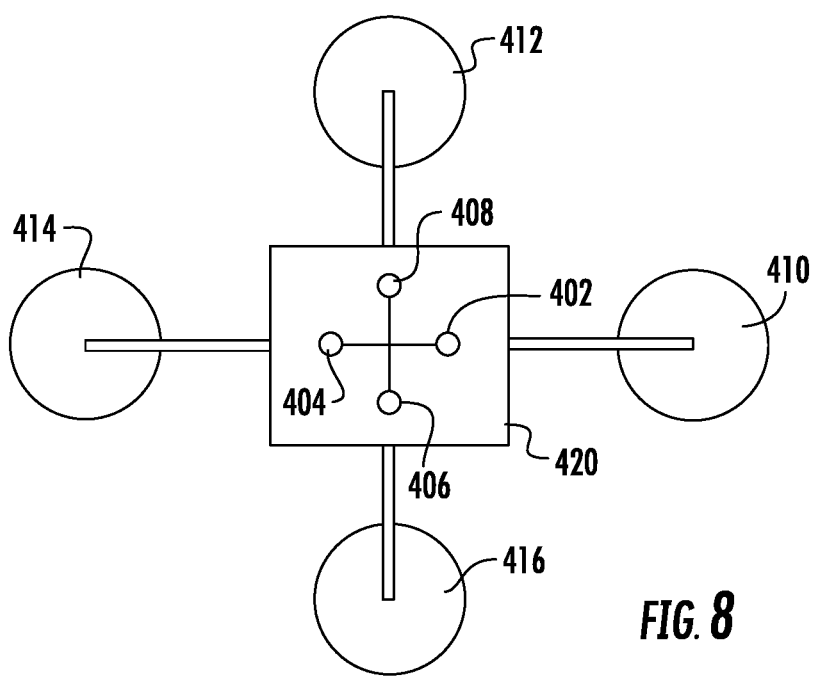
FIG. 8 is a schematic diagram of the orientation of the sensors relative to the motors of the unmanned aerial vehicle in accordance with another embodiment of the invention.

Reference is now made to FIG. 8 in which a tether sensor, generally indicated as 420 constructed in accordance with a second embodiment of the invention is provided. The primary difference between the second embodiment and the prior embodiment is the tether sensor axis being aligned with the motor axis of aircraft 104 in FIG. 7. As can be seen tether sensor 420 includes sensor 402, 404, 406 and 408. The sensors again form axes between sensor pairs 402, 404 and 406, 408 which intersect. The tether connection 210 is substantially positioned at that intersection.

As discussed above, aircraft 104 is a multirotor aircraft. In this embodiment, there are at least 4 rotors each driven by a respective independent motor 410, 412, 414, and 416. As a result of their positioning, there are also axes formed between respective motor pairs. In this embodiment, the axes formed by the sensor pairs 402, 404 and 406, 408 are along the axes formed by motor pairs 410, 414 and 412, 416. They are aligned with each perspective motor axis. Because of this alignment, the output of tether sensor 420 can be used to directly vary the speed of respective motors 410-416 in each axis to achieve the same result as changing the roll and pitch commands discussed above. The motor speeds will always change to reach an equilibrium where the angle of the tether is zero; descend substantially straight down towards the ground station. This follows from the relative thrust provided to aircraft 104 by controlling the respective speeds of the individual motors 410-416.

Figure 9:
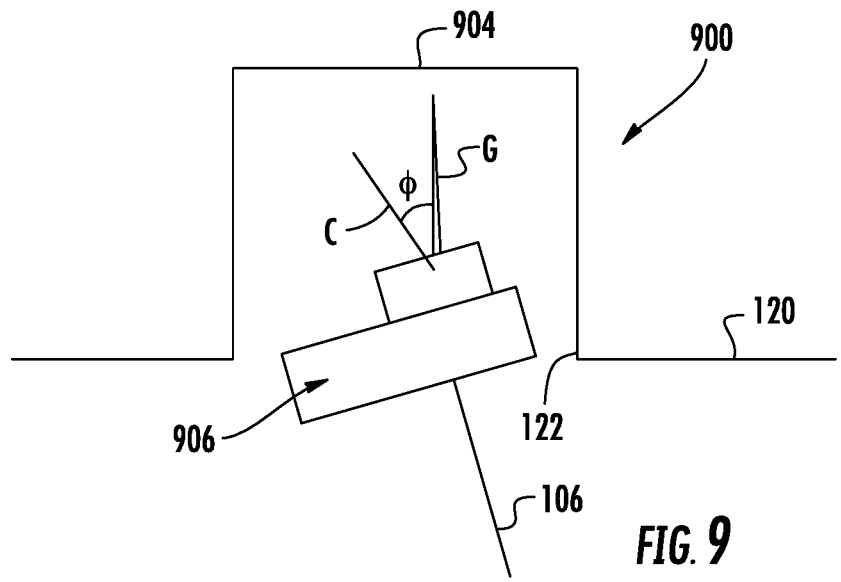
FIG. 9 is a schematic diagram of a sensor arrangement relative to the tether connection in accordance with still another embodiment of the invention.
Figure 10:
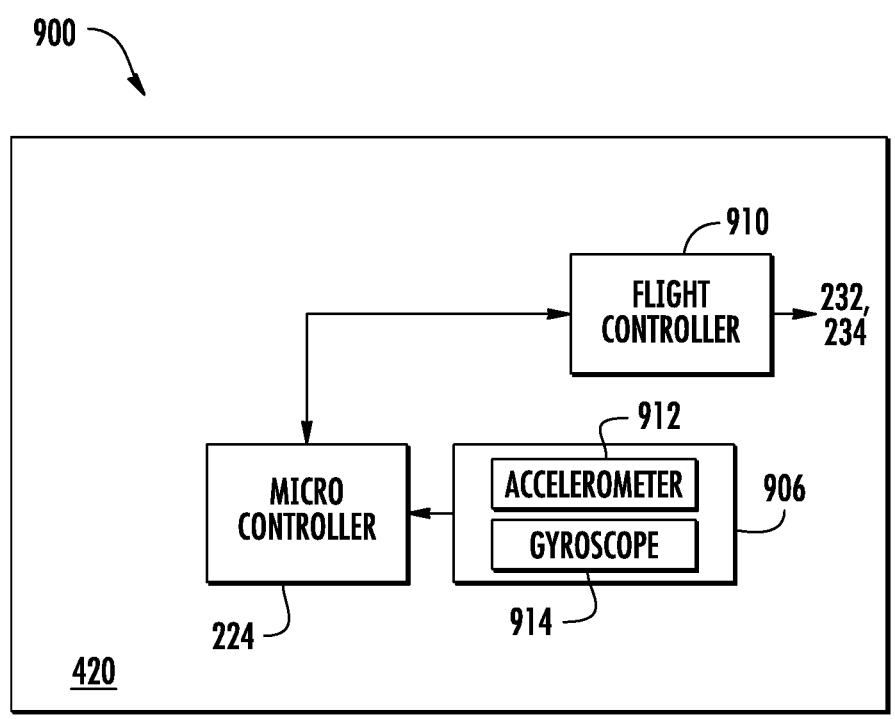
FIG. 10 is a schematic diagram of the control system for the unmanned aerial vehicle in accordance with the still another embodiment of the invention of FIG. 9.

Reference is now made to FIGS. 9 and 10 in which a tether orientation sensor for controlling the position of a tethered aircraft constructed in accordance with another embodiment of the invention is provided. In this embodiment, an accelerometer and gyroscope are utilized as the sensors in addition to, or instead of, the strain sensors discussed above. Like numbers are used to indicate like structure. A UAV 900 includes a housing 904 disposed within opening 122 of substrate 120. A tether orientation sensor 906 is supported by a gimbal (not shown, but known in the art), contained within housing 904, capable of movement about 2 axes; preferably the X and Y axes.

Tether 106 is affixed to tether orientation sensor 906 as discussed above. Sensor 906 includes an accelerometer 912 and a gyroscope 914. Each of gyroscope 914 and accelerometer 914 can detect along 3 axes. Furthermore, because of the ability of sensor 906 to move relative to the X and Y direction, it exhibits 3 dimensions of movement and is substantially free-floating relative to substrate 120.

Accelerometer 912 determines movement relative to the force of gravity. Accelerometer 912 inherently determines the magnitude and direction of gravity. Therefore, sensor 906 determines a line G in the direction of gravity relative to the orientation of sensor 906. Simultaneously, gyroscope 914 determines rotation rate of sensor 906 relative to a reference plane, the reference plane being coplanar with substrate 120. Sensor 906 is connected to tether 106. Because tether sensor 906 is substantially free-floating relative to substrate 120 it changes its orientation relative to substrate 120 as a function of the net forces applied to sensor 906 by tether 106. Because sensor 906 in effect moves with tether 106 sensor 906 determines an angle at which tether 100 extends from sensor 906, and determines a line C which is coaxial with tether 106. Sensor 906 determines an angle Ø between line C and line G.

Sensor 906 outputs angle Ø to microcontroller 224. Utilizing angle Ø, and outputs from the accelerometer 912 and gyroscope 914, microprocessor 224 calculates the position of UAV 104 in the X, Y and Z directions as a function of movement relative to the ground, the base station, or a previously determined position. Furthermore, as discussed above, in a surveillance use, is desirable for UAV 104 to remain in a position normal to the direction of the force of gravity. Utilizing the determined position and/or orientation to the ground, microprocessor 224 outputs position information to flight controller 910, which in turn outputs control signals to the roll output 232 and the pitch output 234 for controlling the operation of aircraft 104. In this way, the value for angle Ø can be utilized to correct the relative positioning of UAV 104 as well as determine the absolute position of UAV 104. In this way, in contrast to the strain sensor embodiment, the measured angle is directly the angle with respect to the normal to the ground and therefore, roll and pitch of UAV 104 no longer need to be compensated for.

As can be seen the output of sensor 906 can be used independently and in conjunction with strain sensors 404-408. Additionally, the output of sensor 906 can be directly used by the flight controller to alter position of the UAV 104. Utilizing updated acceleration and orientation data as output is signals from accelerometer 912 and gyroscope 914 may be input directly into the navigation system of the flight controller to alter the position of UAV 104.

While this invention has been particularly shown and described to reference the preferred embodiments thereof, it would be understood by those skilled in the art that various derivatives and changes in form and detail may be made therein without departing from the spirit and the scope of the invention, by the appended claims.

What is claimed is:

1. An unmanned aerial vehicle comprising:
   a substrate;
   a tether sensor mounted on the substrate, the tether sensor determining an orientation of a tether descending from the substrate relative to ground; and
   a micro controller, receiving the measured orientation from the tether sensor, and determining an orientation of the tether relative to the substrate, and as a function of the orientation, determining a corrective value and outputting the corrective value to the unmanned aerial vehicle as at least one of a roll output and a pitch output control signal to correct a relative position of the substrate to a position in which the tether is normal to the ground.

2. The unmanned aerial vehicle of claim 1, wherein the tether sensor includes an accelerometer and a gyroscope.

3. The unmanned aerial vehicle of claim 2, wherein the tether sensor is substantially free-floating relative to the substrate.

4. The unmanned aerial vehicle of claim 2, wherein the tether sensor determines an angle between a first line coaxial with the tether, and a second line coaxial with the direction of gravity, and the unmanned aerial vehicle further comprising a microcontroller for determining a position of the unmanned aerial vehicle as a function of the first line, second line, and the angle.

5. The unmanned aerial vehicle of claim 2, wherein the microcontroller determines an orientation as a function of first line, second line, and the angle.

6. An unmanned aerial vehicle comprising:
   a substrate;
   a tether sensor mounted on the substrate, the tether sensor determining an orientation of a tether relative to the substrate;
   a tether connection being disposed along at least one axis formed by at least a first strain sensor and a second strain sensor of the three or more strain sensors, each strain sensor measuring a strain applied by the tether to the tether sensor; and
   the micro controller, receiving the measured orientation from the tether sensor, and determining an orientation of the tether relative to the substrate, and as a function of the orientation, determining a corrective value and outputting the corrective value to the unmanned aerial vehicle as at least one of a roll output and a pitch output control signal, and further receiving the measured strain from each respective strain sensor, determining a net strain as a function of a strain measured at each strain sensor, and as a function of the net strain, determining a corrective value and outputting the corrective value as at least one of a roll output and a pitch output control signal.

7. The unmanned aerial vehicle of claim 6, wherein the tether is secured at a first end at the tether connection and at a second end at a position fixed relative to the ground.

8. The unmanned aerial vehicle of claim 6, wherein the corrective value corresponding to at least one of a pitch output control signal and a roll output control signal moving the aerial vehicle to a position at which the net strain has a value of zero.

9. The unmanned aerial vehicle of claim 6, wherein the controller determines a differential between a first strain measured at a first strain sensor and at least a second strain measured at a second strain sensor to calculate a strain differential as a difference between at least the first sensor and the second sensor when the first sensor and second sensor are disposed along a common axis.

10. A method for controlling the positioning of an unmanned aerial vehicle, the unmanned aerial vehicle having a substrate; a tether sensor mounted on the substrate, the method comprising the steps of:
   utilizing the tether sensor to determine a start position of the tether relative to a position of the substrate;

remove at least one of a roll of the unmanned aerial vehicle and a pitch of the unmanned aerial vehicle relative to the start position of the unmanned aerial vehicle;

output a pulse width modulated signal to a flight controller for controlling a motor to return the unmanned aerial vehicle to the start position as a function of the determination of the position of the tether relative to the position of the substrate.

11. The method for controlling the positioning of an unmanned aerial vehicle of claim 10, wherein the tether sensor is a strain sensor, and wherein the position of the tether relative to a position of the substrate is determined as a function of net strain of the tether.

12. The method for controlling the positioning of an unmanned aerial vehicle of claim 10, further comprising an accelerometer and a gyroscope, and wherein removing at least one of a roll of the unmanned aerial vehicle and a pitch of the unmanned aerial vehicle relative to a start position of the unmanned aerial vehicle is a function of an output from the alt least one of the accelerometer and the gyroscope.

13. The method for controlling the positioning of an unmanned aerial vehicle of claim 10, wherein the control signal for controlling the motor is provided by determining the proportional derivative integral.

14. The method for controlling the positioning of an unmanned aerial vehicle of claim 10, wherein tether sensor includes a gyroscope and an accelerometer.

* * * * *